United States Patent
Kim et al.

(10) Patent No.: US 9,184,895 B2
(45) Date of Patent: Nov. 10, 2015

(54) METHOD AND APPARATUS OF INTERFERENCE ALIGNMENT IN CELLULAR NETWORK

(71) Applicants: LG ELECTRONICS INC., Seoul (KR); POSTECH ACADEMY-INDUSTRY FOUNDATION, Gyeongsangbuk-do (KR)

(72) Inventors: Ki Jun Kim, Seoul (KR); Joon Ho Cho, Gyeongsangbuk-do (KR); Yeo Hun Yun, Gyeongsangbuk-do (KR); Min Uk Kim, Gyeongsangbuk-do (KR); Ju Bum Kim, Gyeongsangbuk-do (KR)

(73) Assignees: LG ELECTRONICS INC., Seoul (KR); POSTECH ACADEMY-INDUSTRY FOUNDATION, Gyeongsanbuk-Do (KR)

( * ) Notice: Subject to any disclaimer, the term of this patent is extended or adjusted under 35 U.S.C. 154(b) by 84 days.

(21) Appl. No.: 14/259,965

(22) Filed: Apr. 23, 2014

(65) Prior Publication Data

US 2015/0036599 A1 Feb. 5, 2015

Related U.S. Application Data

(60) Provisional application No. 61/862,498, filed on Aug. 5, 2013.

(51) Int. Cl.
*H04L 5/00* (2006.01)
*H04B 7/04* (2006.01)
*H04B 7/06* (2006.01)

(52) U.S. Cl.
CPC ............ *H04L 5/0073* (2013.01); *H04B 7/0456* (2013.01); *H04B 7/0617* (2013.01)

(58) Field of Classification Search
None
See application file for complete search history.

(56) References Cited

U.S. PATENT DOCUMENTS

| | | | |
|---|---|---|---|
| 2007/0122044 A1* | 5/2007 | Ito | H04N 19/60 382/233 |
| 2014/0219389 A1* | 8/2014 | Murakami | H04L 5/00 375/296 |

* cited by examiner

*Primary Examiner* — Hong Cho
(74) *Attorney, Agent, or Firm* — Lee, Hong, Degerman, Kang & Waimey

(57) ABSTRACT

Disclosed are a method and an apparatus of interference alignment in a cellular network. The method of interference alignment in the cellular network includes: receiving, by a base station, an improper signal from a terminal; and decoding, by the base station, the improper signal based on an improper decoding vector, wherein the improper signal is a signal generated by only a modulation symbol corresponding to a real number value, the improper decoding vector is determined based on an improper precoding vector, and the improper precoding vector has only the real value and separates a real number space and an imaginary number space of a received signal.

6 Claims, 6 Drawing Sheets

METHOD AND APPARATUS OF INTERFERENCE ALIGNMENT IN CELLULAR NETWORK

CROSS-REFERENCE TO RELATED APPLICATIONS

Pursuant to 35 U.S.C. § 119(e), this application claims the benefit of U.S. Provisional Patent Application Ser. No. 61/862,498, filed on Aug. 5, 2013, the contents of which are hereby incorporated by reference herein in their entirety.

BACKGROUND OF THE INVENTION

1. Field of the Invention

The present invention relates to wireless communication, and more particularly, to a method and an apparatus of interference alignment in a cellular network.

2. Related Art

In recent years, a service requiring ultra-high wireless communication such as wireless Internet has increased rapidly. As a result, a research into a communication technique that can the ultra-high wireless communication for a next-generation wireless communication system has been actively progressed. Therefore, a lot of researches for a plurality of users to efficiently use resources including time, a frequency, a space, and the like for communication were progressed. However, there is a problem that a high channel capacity for ultra-high communication cannot be acquired due inter-user interference when users are more than given resources by techniques such as a frequency division access technique, a time-division access technique, a code division access technique, and the like in the related art.

Accordingly, in recent years, in order to solve the problem that the high channel capacity cannot be acquired due to the inter-user interference, an interference alignment (IA) technology that separates a desired signal and into different spaces is proposed, and as a result, theoretical development of a transmission and reception technique undesired interference has been reformed. It is demonstrated that such a technique prevents performance degradation by interference without complicated error correction encoding under a multiple user environment of a general interference channel, acquire a degree-of-freedom by maximizing the use of the given resources, and acquire the high channel capacity.

In detail, the interference alignment technique can almost a channel capacity of an interference channel under a situation in which a signal-to-ratio is very high. The interference alignment technology is extended to the cellular network as well as the interference channel to be researched. It is revealed that in the cellular network constituted by two cells, users that are positioned in other cell are applied to a base station of a current cell may allow interference signals to be aligned and received into a specific signal space, and as a result, a lot of signal spaces for users in the current cell may be ensured. For example, when respective users transmits one stream, the users may allow an interference signal applied to the base station of other cell to be aligned and received into one-dimension signal space.

SUMMARY OF THE INVENTION

An object of the present invention is to provide a method of interference alignment in a cellular network.

Another object of the present invention is to provide an apparatus that performs a method of interference alignment in a cellular network.

In accordance with an embodiment of the present invention, a method of interference alignment in a cellular network includes: receiving, by a base station, an improper signal from a terminal; and decoding, by the base station, the improper signal based on an improper decoding vector, wherein the improper signal is a signal generated by only a modulation symbol corresponding to a real number value, the improper decoding vector is determined based on an improper precoding vector, and the improper precoding vector has only the real value and separates a real number space and an imaginary number space of a received signal.

In accordance with another embodiment of the present invention, a base station that performs interference alignment in a cellular network, includes: a radio frequency (RF) unit implemented to transmit or receive a radio signal; and a processor selectively connected to the RF unit, wherein the processor is implemented to receive an improper signal from a terminal and decode the improper signal based on an improper decoding vector, the improper signal is a signal generated by only a modulation symbol corresponding to a real number value, the improper decoding vector is determined based on an improper precoding vector, and the improper precoding vector has only the real value and separates a real number space and an imaginary number space of a received signal.

According to the present invention, a user can transmit and receive data with more improved performance than the existing method in a cellular network where a numerical figure is saturated by using an interference alignment iteration algorithm based a symbol having improperness.

DESCRIPTION OF EXEMPLARY EMBODIMENTS

Figure 1:
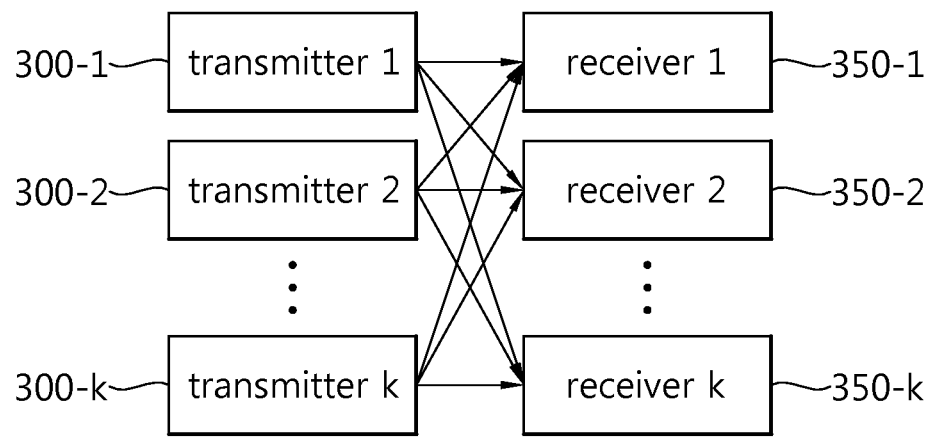
FIG. 1 is a conceptual diagram illustrating an interference channel according to an embodiment of the present invention.

A terminal (user equipment, UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like.

The base station generally represents a fixed station that communicates with a terminal, and may be called different terms such as an evolved-NodeB (eNB), a base transceiver system (BTS), an access point, and the like.

In recent years, services and users requiring ultra-high wireless communication such as wireless Internet has increased rapidly. In particular, in a floating population center of a downtown area, more users than a capacity supported by a communication system exist, and as a result, it is difficult to satisfy individual quality of service. In order to satisfy a quality of service requested by a plurality of terminals, interference alignment technology is researched.

The interference alignment technology is the technology that separately transmits a desired signal and undesired interference to different spaces. When the interference alignment technology is used, performance degradation by interference under a multiple user environment may be prevented and simultaneously a maximum degree-of-freedom may be acquired by maximizing the use of given resources. Accordingly, by using the interference alignment technology, a high channel capacity may be acquired. However, interference alignment technologies known up to now in a wireless communication network have problems to be described below.

In the case of the existing interference alignment technology, only an interference channel is considered and a direct channel is not considered. The direct channel indicates a channel through which the terminal (or mobile station (MS)) transmits a signal to a base station (or base station) to which the terminal belongs in the case of an uplink and indicates a channel through which the base station (BS) transmits a signal to the mobile station (MS) included in the BS in the case of a downlink. Since a main purpose of an interference network interference alignment is an alignment of interference as well as a cellular network interference alignment, only the interference channel is considered and the direct channel is not considered, in general.

However, the interference alignment method may not be optimal in an infinite (SNR) section but a finite SNR section. If the direct channel is to be considered in the interference alignment method, a gain may be increased at the time of receiving a desired signal in the terminal or the base station. Therefore, when the direct is to be considered in the interference alignment method, relatively higher sum-rate may be achieved as compared with the case in which the direct channel is not considered. When the direct channel is considered in the interference alignment method, global channel information may be required.

In recent years, in a lot of interference alignment methods, a specific node having the global channel information is present and the specific node generally notifies a transmission method for interference alignment to each terminal or terminal However, it may be actually difficult for the specific node to know the global channel information.

Distributed interference alignment (IA) is a representative algorithm to solve an interference alignment problem in the existing interference channel. A distributed interference alignment method in the interference channel representatively includes a signal to interference-plus-noise ratio (Max-SINR) algorithm, and a minimum mean square error (MMSE)-IA, and an iterative algorithm similar thereto. The distributed interference alignment method may be performed based on reciprocity of a channel. The channel reciprocity may be generally established in an environment using time-division duplexing (TDD).

When the channel reciprocity is established, a direction of a received beam set for minimum interference in a receiver becomes a direction in which minimum interference is applied to other transmitters at the time when the receiver performs transmission contrary to this.

However, in a network in a saturated state, it is difficult to separate the desired signal and the undesired interference signal due to shortage of a signal space due to a plurality of terminals. Accordingly, satisfactory performance may not be achieved by only the existing Max-SINR and the existing MMSE-IA algorithm. Accordingly, in the embodiment of the present invention, a method is disclosed, which arbitrarily ensures the signal space capable of using the distributed IA when the signal space is short in a saturation state in the number of users in a cell.

A probability variable (alternatively, random variable) in which a reciprocal autocorrelation coefficient is 0 may be proper or a proper probability variable. On the contrary, a probability variable in which the reciprocal autocorrelation coefficient is not 0 may be improper or an improper probability variable. In general, a symbol used for communication is a proper probability variable having a complex value. That is, the symbol used of the communication has power of a real number part and power of an imaginary number part and has a characteristic in which a mutual correlation coefficient is 0. However, in the cellular network in the saturated state, it is necessary to ensure the signal space in order to acquire desired interference alignment performance due to the shortage of the signal space. In order to solve the problem, it is necessary to ensure the signal space by using improperness of a transmission symbol.

That is, in the interference alignment method according to the embodiment of the present invention in order to ensure the performance of the interference alignment in a cellular network in which user numerical figures are saturated by considering the improper symbol, the signal space may be ensured by using more improved performance than the existing method.

FIG. 1 is a conceptual diagram illustrating an interference channel according to an embodiment of the present invention.

In FIG. 1, an interference channel in communication between K transmitters 300-1, 300-2, . . . , 300-$k$ and K receivers 350-1, 350-2, . . . , 350-$k$ is disclosed.

Referring to FIG. 1, K transmitters 300-1, 300-2, . . . , 300-$k$ and K receivers 350-1, 350-2, . . . , 350-$k$ exist and the respective transmitters may transfer signals to all of K receivers 350-1, 350-2, . . . , 350-$k$. For example, based on a specific receiver (for example, a first receiver 350-1), only a signal from a specific transmitter (for example, a first transmitter 300-1) may be a desired signal transmitted through a direct channel and signals transmitted from remaining transmitters (for example, a second transmitter 300-2 to a k-th transmitter 300-$k$) may be interference signals transmitted through the interference channel.

In the case of an interference alignment algorithm of the existing interference channel, the interference alignment may be performed based on channel reciprocity. The channel reciprocity may be generally established in a time-division duplexing (TDD) based communication environment. In the embodiment of the present invention, the channel reciprocity is extended to the cellular network to assume an equivalent interference channel environment.

Figure 2:
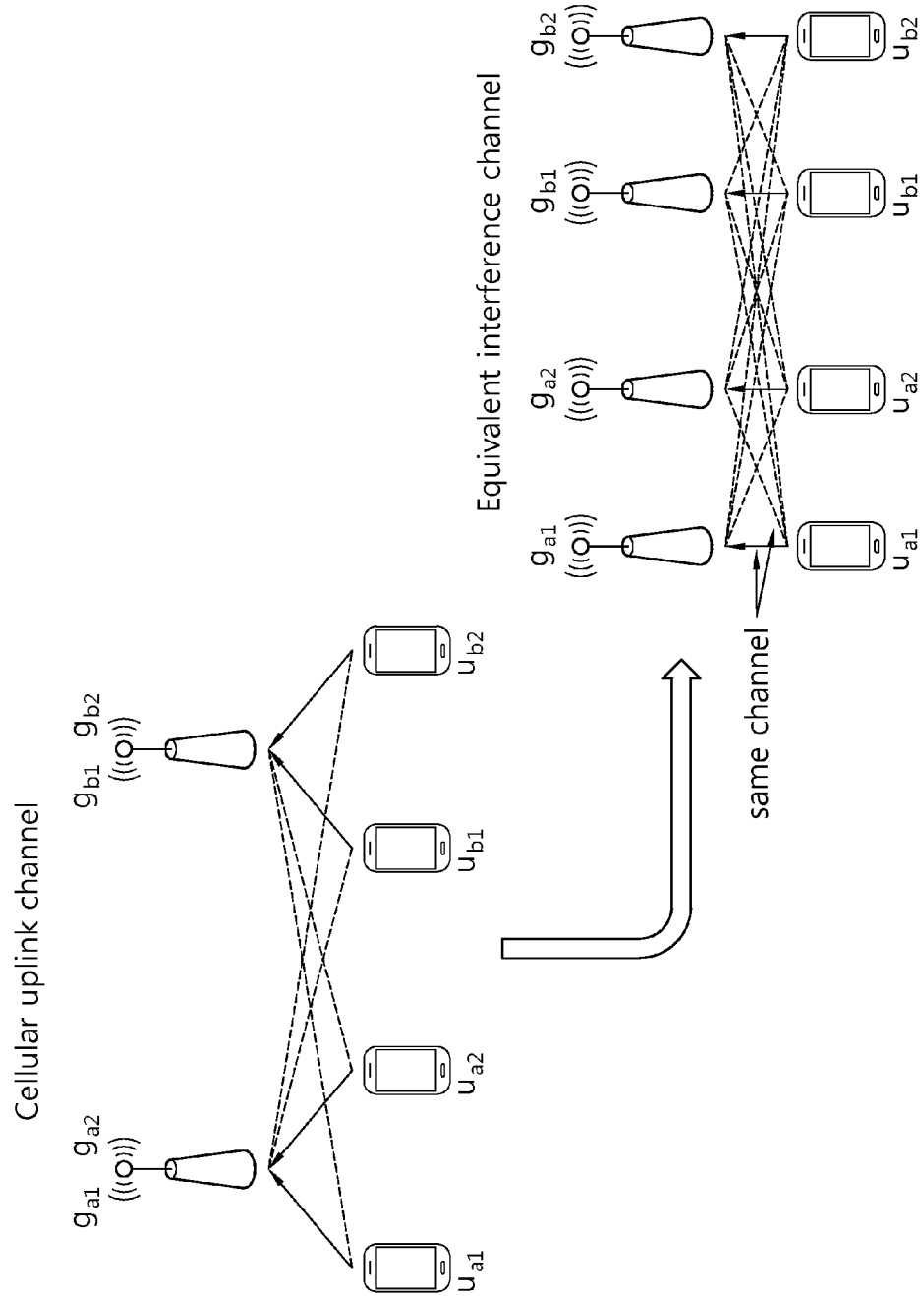
FIG. 2 is a conceptual diagram illustrating a cellular network according to an embodiment of the present invention.

FIG. 2 is a conceptual diagram illustrating a cellular network according to an embodiment of the present invention.

Referring to FIG. 2, a cellular uplink channel is extended to be modified to the equivalent interference channel.

In a method of interference alignment according to an embodiment of the present invention, distributed interference alignment may be performed based on the channel reciprocity with respect to the equivalent interference channel modified by extending the cellular uplink channel.

Equation 1 below represents modeling that the base station receives uplink data.

$$y^b = \sum_{l=1}^{B} \sum_{k=1}^{K} H_{lk}^b v_{lk} x_{lk} + w^b \qquad \text{<Equation 1>}$$

Respective variables of Equation may have meanings described below.

$y^b$ representing a signal vector received by a b-th base station $H_{lk}^b$ representing a channel when a k-th user terminal in a 1-st cell sends to a b-th base station $v_{lk}$ representing a precoding vector of the k-th user terminal in the 1-th cell $x_{lk}$ representing a transmission symbol of the k-th user terminal in the 1-th cell $w^b$ representing noise of a b-th base station B and K may be determined based on the number of base stations and the number of user terminals.

In the embodiment of the present invention, in order to ensure the signal space by extending a signal to interference-plus-noise ratio (Max-SINR) algorithm and a minimum mean square estimation-interference alignment (IA) algorithm based on improperness of a symbol, Equation 1 which is an uplink receiving signal model modeled on the assumption of the existing properness may be extended like Equation 2.

$$\bar{y}^b = \sum_{l=1}^{B} \sum_{k=1}^{K} \bar{H}_{lk}^b \bar{v}_{lk} x_{lk} + \bar{w}^b \qquad \text{<Equation 2>}$$

$$\bar{y}^b \triangleq \begin{bmatrix} \Re\{y^b\} \\ \Im\{y^b\} \end{bmatrix}$$

$$\bar{H}_{lk}^b \triangleq \begin{bmatrix} \Re\{H_{lk}^b\} & -\Im\{H_{lk}^b\} \\ \Im\{H_{lk}^b\} & \Re\{H_{lk}^b\} \end{bmatrix}$$

$$\bar{w}_b \triangleq \begin{bmatrix} \Re\{w^b\} \\ \Im\{w^b\} \end{bmatrix}$$

$$\bar{v}_{lk} \triangleq \begin{bmatrix} \Re\{v_{lk}\} \\ \Im\{v_{lk}\} \end{bmatrix}$$

According to the embodiment of the present invention, the variables are extended to a vector generated by joining a real number part and an imaginary number part to be converted to a vector of which all values are only real number values as described above. Further, the communication based the improper symbol may be performed by only a precoding vector design by restricting a user's transmission symbol $x_{lk}$ to be sent to only a real number value.

When the communication based on the existing proper symbol is performed, communication is performed based on a precoding vector having only properness and a complex symbol having properness. When the communication is performed based on the existing proper symbol, a new signal space using a real number value and an imaginary number value having improperness and a correlation of both values may not be used. On the contrary, as described in the embodiment of the present invention, when an improper precoding vector having only the real number value acquired in Equation 2 and an improper symbol (for example, a real-number symbol) are used, an optimal real number value and an optimal imaginary number value and a correlation of both values may be used according to circumstances. In particular, a short signal space may be finely divided and used under a saturated cellular network situation.

Hereinafter, in the embodiment of the present invention, a method is disclosed, which determines a precoding vector $v_{lk}$, having improperness and a decoding vector $g_{bk}$ having improperness by using an algorithm to maximize an SINR by using the vector having only the real value.

Further, hereinafter, in the embodiment of the present invention, a method is disclosed, which determines the precoding vector $v_{lk}$ having improperness and the decoding vector $g_{bk}$ having improperness by using an algorithm to minimize an MMSE by using the vector having only the real value.

Equation 3 presents a method that determines the precoding vector $v_{lk}$ having improperness and the decoding vector $g_{bk}$ having improperness by using the algorithm to maximize the SINR.

$$\bar{g}_{bk} = \alpha_k \left( \sum_{i=1}^{K} \bar{H}_{bi}^b \bar{v}_{bi} \bar{v}_{bi}^T \bar{H}_{bi}^{bT} + \bar{R}_{ici}^b + \sigma^2 I_{2N} \right)^{-1} \bar{H}_{bk}^b \bar{v}_{bk} \qquad \text{<Equation 3>}$$

$$\bar{R}_{ici}^b \triangleq \sum_{l \neq b}^{B} \sum_{i=1}^{K} \bar{H}_{li}^b \bar{v}_{li} \bar{v}_{li}^T \bar{H}_{li}^{bT}$$

$$\bar{v}_{bk} = \beta_k \left( \bar{R}_{ici}^{t'} + \sigma^2 I_{2M} \right)^{-1} \bar{H}_{bk}^{bT} \bar{g}_{bk}$$

$$\bar{R}_{ici}^{t'} \triangleq \sum_{l \neq b}^{B} \sum_{i=1}^{K} \bar{H}_{bk}^{lT} \bar{g}_{li} \bar{g}_{li}^T \bar{H}_{bk}^{l}$$

$\bar{g}_{bk}$ represents a decoding vector of the k-th user terminal of the b-th base station.

As described above, $\bar{H}_{yz}^x$ may represent a transmission channel function when a z-th user in a y-th cell separated into a real number space and an imaginary number space transmits data to an x-th base station and $\bar{v}_{xy}$ may be an improper precoding vector of a y-th user in an x-th cell separated into the real number space and the imaginary number space.

Figure 3:
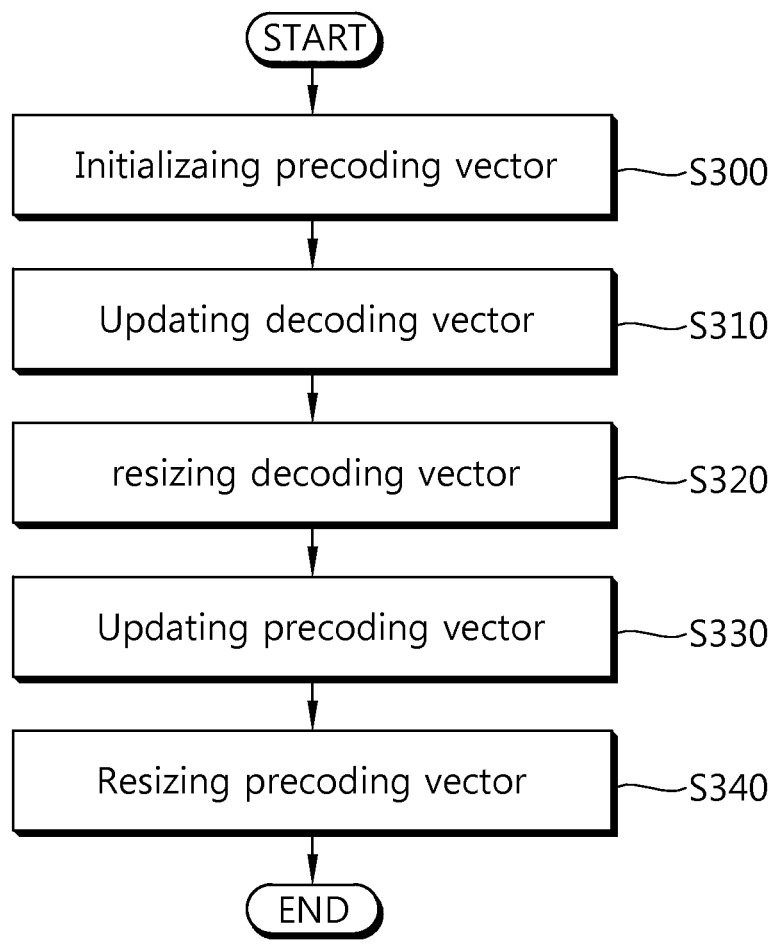
FIG. 3 is a flowchart illustrating a method for determining an improper precoding vector and an improper decoding vector according to an embodiment of the present invention.

When iteration is performed through the algorithm of Equation 3, the precoding vector having improperness may be determined When a signal space is not sufficient, the improper precoding vector and the improper decoding vector may be determined through the algorithm of FIG. 3. The improper precoding vector and the improper decoding vector may more efficiently perform interference alignment through an effect to avoid interference by separating signal spaces of real number and imaginary number parts.

In Equation 3, $\alpha_k = 1/\|\bar{g}_{bk}^2\|$, $\beta_k 1/\|\bar{v}_{bk}^2\|$ represent conversion constants for making the size of the vector to 1. $\sigma^2$ represents a distribution of noise.

FIG. 3 is a flowchart illustrating a method for determining an improper precoding vector and an improper decoding vector according to an embodiment of the present invention.

FIG. 3 discloses the method that determines the precoding vector $v_{lk}$ having the improperness and the decoding vector $g_{bk}$ having the improperness by using the algorithm to maximize the SINR.

Referring to FIG. 3, the precoding vector is initialized (step S300).

The precoding vector may be initialized to $\bar{v}_1, \ldots \bar{v}_K$.

The decoding vector is updated (step S310).

The decoding vector may be updated through $$\bar{g}_{bk} = \left( \sum_{l=1}^{B} \sum_{i=1}^{K} \bar{H}_{li}^b \bar{v}_{bi} \bar{v}_{bi}^T \bar{H}_{li}^{bT} + \sigma^2 I_{2N} \right)^{-1} \bar{H}_{bk}^b \bar{v}_{bk}$$

of Equation 3 described above.

The size of the decoding vector is adjusted (step S320).

The size of the decoding vector updated through step S310 may be adjusted based on $\|\bar{g}_{bk}^2\|=1$.

The precoding vector is updated (step S330).

The precoding vector may be updated through $$\bar{v}_{bk} = \left( \sum_{l \neq b}^{B} \sum_{i=1}^{K} \overline{H}_{li}^{bT} \bar{g}_{li} \bar{g}_{bi}^{T} \overline{H}_{li}^{b} + \sigma^2 I_{2N} \right)^{-1} \overline{H}_{bk}^{bT} \bar{g}_{bk}$$

of Equation 3 described above.

The size of the updated precoding vector is adjusted (step S340).

The size of the precoding vector updated through step S330 may be adjusted based on $\|\bar{v}_{bk}^2\|=1$.

After the size is adjusted, the process returns to step S310 again to update the decoding vector based the updated precoding vector.

Equation 4 below presents a method that determines the precoding vector $v_{lk}$ having improperness and the decoding vector $g_{bk}$ having improperness by using the algorithm to minimize the MMSE.

$$\bar{g}_{bk} = \left( \sum_{i=1}^{K} \overline{H}_{bi}^{b} \bar{v}_{bi} \bar{v}_{bi}^{T} \overline{H}_{bi}^{bT} + \overline{R}_{ici}^{b} + \sigma^2 I_{2N} \right)^{-1} \overline{H}_{bk}^{b} \bar{v}_{bk}$$ [Equation 4]

$$\overline{R}_{ici}^{b} \triangleq \sum_{l \neq b}^{B} \sum_{i=1}^{K} \overline{H}_{li}^{b} \bar{v}_{li} \bar{v}_{li}^{T} \overline{H}_{li}^{bT}$$

$$\bar{v}_{bk} = \left( \overline{R}_{ici}^{l'} + \lambda_{bk} I_{2M} \right)^{-1} \overline{H}_{bk}^{bT} \bar{g}_{bk}$$

$$\overline{R}_{ici}^{l'} \triangleq \sum_{l \neq b}^{B} \sum_{i=1}^{K} \overline{H}_{bk}^{lT} \bar{g}_{li} \bar{g}_{li}^{T} \overline{H}_{bk}^{l}$$

In this equation, $\lambda_{bk}$ represents a value used to make the size of the precoding vector to 1.

Figure 4:
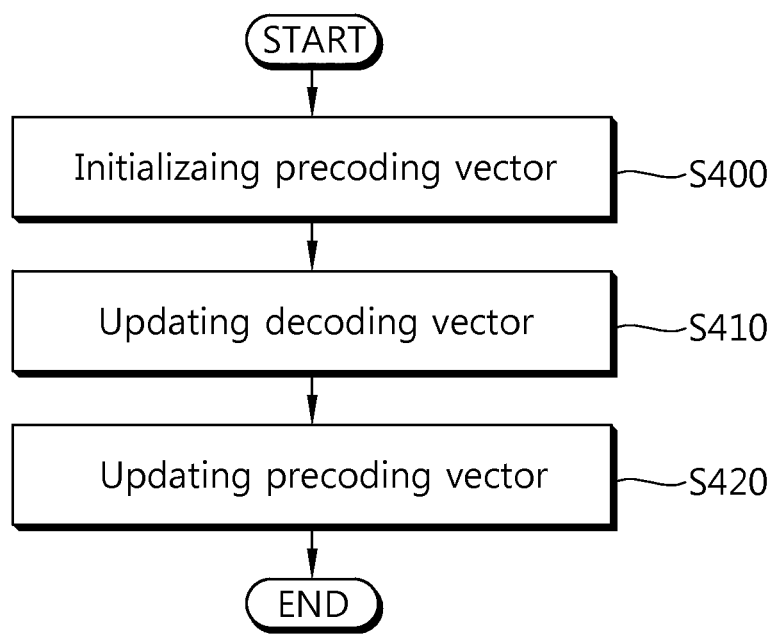
FIG. 4 is a flowchart illustrating a method for determining an improper precoding vector and an improper decoding vector according to an embodiment of the present invention.

FIG. 4 is a flowchart illustrating a method for determining an improper precoding vector and an improper decoding vector according to an embodiment of the present invention.

FIG. 4 discloses the method that determines the precoding vector $v_{lk}$ having the improperness and the decoding vector ghk having the improperness by using the algorithm to minimize the MMSE.

Referring to FIG. 4, the precoding vector is initialized (step S400).

The precoding vector may be initialized to $\bar{v}_1, \ldots \bar{v}_K$.

The decoding vector is updated (step S410).

The decoding vector may be updated through $$\bar{g}_{bk} = \left( \sum_{i=1}^{B} \sum_{i=1}^{K} \overline{H}_{li}^{b} \bar{v}_{li} \bar{v}_{bi}^{T} \overline{H}_{li}^{bT} + \sigma^2 I_{2N} \right)^{-1} \overline{H}_{bk}^{b} \bar{v}_{bk}$$

of Equation 4 described above.

The precoding vector is updated (step S420).

The precoding vector may be updated through $$\bar{v}_{bk} = \left( \sum_{l \neq b}^{B} \sum_{i=1}^{K} \overline{H}_{li}^{bT} \bar{g}_{li} \bar{g}_{bi}^{T} \overline{H}_{li}^{b} + \lambda_{bk} I_{2N} \right)^{-1} \overline{H}_{bk}^{bT} \bar{g}_{bk}$$

of Equation 4 described above.

In step S420, $\lambda_{bk}$ satisfying $\|\bar{v}_{bk}^2\|=1$ may be selected while updating the precoding vector.

Step S410 is again performed to update the decoding vector based on the precoding vector updated through step S420.

Figure 5:
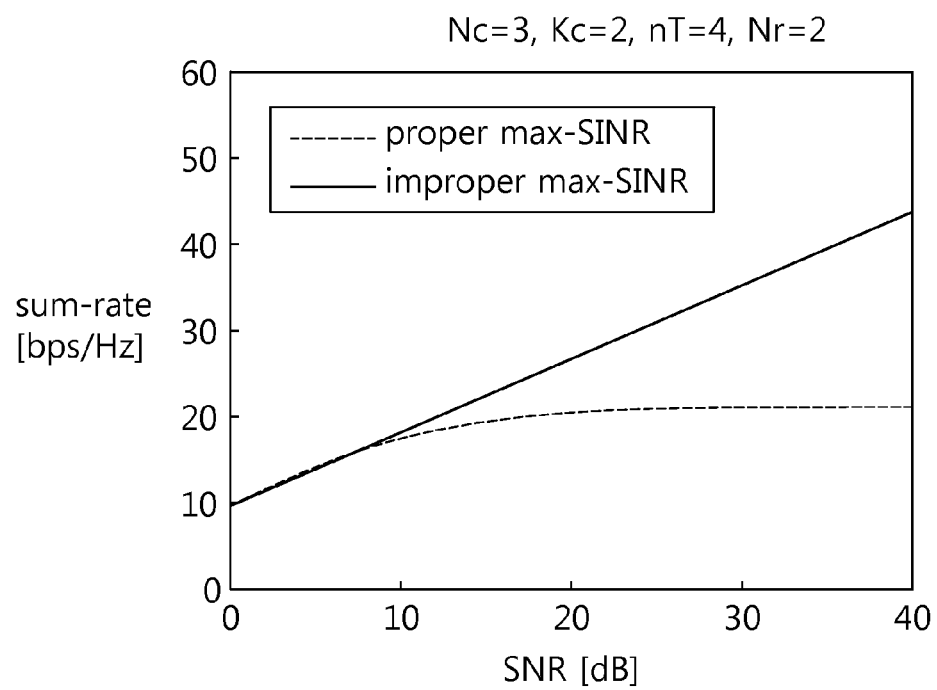
FIG. 5 is a graph illustrating a result of simulating interference alignment based on an improper symbol according to an embodiment of the present invention.

FIG. 5 is a graph illustrating a result of simulating interference alignment based on an improper symbol according to an embodiment of the present invention.

In FIG. 5, a simulation result in the case of 3 cells, 3 users per cell, 4 transmitting antennas, and 2 receiving antennas is illustrated.

Under an environment in which a space for interference alignment is short, a result of performing the interference alignment based on an improper symbol according to the embodiment of the present invention and a case of performing the interference alignment based on an proper symbol in the related art are compared with h each other.

Referring to FIG. 5, in the case of performing the interference alignment based on the improper symbol according to the embodiment of the present invention, it may be seen that sum-rate is increased as an SNR is increased by comparing the case of performing the interference alignment based on the improper symbol according to the embodiment of the present invention and the case of performing the interference alignment based on the proper symbol with each other.

Figure 6:
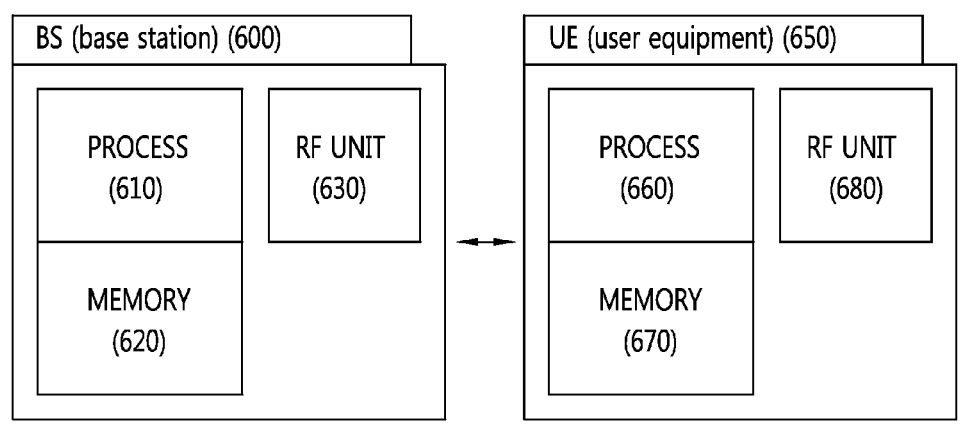
FIG. 6 is a block diagram illustrating a wireless communication system according to an embodiment of the present invention.

FIG. 6 is a block diagram illustrating a wireless communication system according to an embodiment of the present invention.

Referring to FIG. 6, a base station 600 includes a processor 610, a memory 620, and a radio frequency (RF) unit 630. The memory 620 is connected with the processor 610 to store various pieces of information for driving the processor 610. The RF unit 620 is connected with the processor 910 to transmit and/or receive the radio signal. The processor 610 implements a function, a process, and/or a method which are proposed. In the aforementioned embodiment, the operation of the base station may be implemented by the processor 610.

Similarly, a UE 650 includes a processor 660, a memory 670, and an RF unit 680. The memory 670 is connected with the processor 660 to store various pieces of information for driving the processor 660. The RF unit 680 is connected with the processor 660 to transmit and/or receive the radio signal. The processor 660 implements a function, a process, and/or a method which are proposed. In the aforementioned embodiment, the operation of the terminal may be implemented by the processor 660.

For example, the processors 610 and 660 may perform the interference alignment based on an improper signal in a cellular network. The processors 610 and 660 are implemented to receive the improper signal from the terminal and decode the improper signal based on the improper decoding vector, in which the improper signal may be a signal generated by only a modulation symbol corresponding to a real number value, the improper decoding vector may be determined based on the improper precoding vector, the improper precoding vector may have only the real number value, and a real number space and an imaginary number space of a received signal may be separated.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or another storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be present inside or outside the processor and may be connected with the processor through various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method of interference alignment in a cellular network, comprising:
   receiving, by a base station, an improper signal from a terminal; and
   decoding, by the base station, the improper signal based on an improper decoding vector,
   wherein the improper signal is a signal generated by only a modulation symbol corresponding to a real number value,
   the improper decoding vector is determined based on an improper precoding vector, and
   the improper precoding vector has only the real value and separates a real number space and an imaginary number space of a received signal.

2. The method of claim 1, wherein:
the improper decoding vector is $$\bar{g}_{bk} = \alpha_k \left( \sum_{i=1}^{K} \bar{H}_{bi}^{b} \bar{v}_{bi} \bar{v}_{bi}^{T} \bar{H}_{bi}^{bT} + \bar{R}_{ici}^{b} + \sigma^2 I_{2N} \right)^{-1} \bar{H}_{bk}^{b} \bar{v}_{bk},$$

the $\bar{R}_{ici}^{b}$ is $$\bar{R}_{ici}^{b} \triangleq \sum_{l \neq b}^{B} \sum_{i=1}^{K} \bar{H}_{li}^{b} \bar{v}_{li} \bar{v}_{li}^{T} \bar{H}_{li}^{bT},$$

the $\bar{v}_{bk}$ as the improper precoding vector is $$\bar{v}_{bk} = \beta_k (\bar{R}_{ici}^{l'} + \sigma^2 I_{2M})^{-1} \bar{H}_{bk}^{bT} \bar{g}_{bk},$$

the $R_{ici}^{l'}$ is $$\bar{R}_{ici}^{l'} \triangleq \sum_{l \neq b}^{B} \sum_{i=1}^{K} \bar{H}_{bk}^{lT} \bar{g}_{li} \bar{g}_{li}^{T} \bar{H}_{bk}^{l},$$

the $\bar{H}_{yz}^{x}$ represent a transmission channel function when a z-th user in a y-th cell separated into a real number space and an imaginary number space transmits data to an x-th base station, the $\bar{v}_{xy}$ is s an improper precoding vector of a y-th user in an x-th cell separated into the real number space and the imaginary number space, and the $\alpha_k = 1/\|\bar{g}_{bk}^{2}\|$ and the $\beta_k = 1/\|\bar{v}_{bk}^{2}\|$ represent conversion constants for making the size of the vector to 1.

3. The method of claim 1, wherein:
the improper decoding vector is $$\bar{g}_{bk} = \left( \sum_{i=1}^{K} \bar{H}_{bi}^{b} \bar{v}_{bi} \bar{v}_{bi}^{T} \bar{H}_{bi}^{bT} + \bar{R}_{ici}^{b} + \sigma^2 I_{2N} \right)^{-1} \bar{H}_{bk}^{b} \bar{v}_{bk},$$

the $\bar{R}_{ici}^{b}$ is $$\bar{R}_{ici}^{b} \triangleq \sum_{l \neq b}^{B} \sum_{i=1}^{K} \bar{H}_{li}^{b} \bar{v}_{li} \bar{v}_{li}^{T} \bar{H}_{li}^{bT},$$

the $\bar{v}_{bk}$ as the improper precoding vector is $\nabla_{bk} = (\bar{R}_{ici}^{l'} + \lambda_{bk} I_{2M})^{-1} \bar{H}_{bk}^{bT} \bar{g}_{bk}$,
the $\bar{R}_{ici}^{l'}$ is $$\bar{R}_{ici}^{l'} \triangleq \sum_{l \neq b}^{B} \sum_{i=1}^{K} \bar{H}_{bk}^{lT} \bar{g}_{li} \bar{g}_{li}^{T} \bar{H}_{bk}^{l},$$

the $\bar{H}_{yz}^{x}$ represent a transmission channel function when a z-th user in a y-th cell separated into a real number space and an imaginary number space transmits data to an x-th base station, the $\bar{v}_{xy}$ is an improper precoding vector of a y-th user in an x-th cell separated into the real number space and the imaginary number space, and the $\lambda_{bk}$ is a value for making the size of the improper precoding vector to 1.

4. A base station that performs interference alignment in a cellular network, comprising:
   a radio frequency (RF) unit implemented to transmit or receive a radio signal; and
   a processor selectively connected to the RF unit,
   wherein the processor is implemented to receive an improper signal from a terminal and decode the improper signal based on an improper decoding vector,
   the improper signal is a signal generated by only a modulation symbol corresponding to a real number value,
   the improper decoding vector is determined based on an improper precoding vector, and
   the improper precoding vector has only the real value and separates a real number space and an imaginary number space of a received signal.

5. The base station of claim 4, wherein:
the improper decoding vector is $$\bar{g}_{bk} = \alpha_k \left( \sum_{i=1}^{K} \bar{H}_{bi}^{b} \bar{v}_{bi} \bar{v}_{bi}^{T} \bar{H}_{bi}^{bT} + \bar{R}_{ici}^{b} + \sigma^2 I_{2N} \right)^{-1} \bar{H}_{bk}^{b} \bar{v}_{bk},$$

the $\bar{R}_{ici}^{b}$ is $$\bar{R}_{ici}^{b} \triangleq \sum_{l \neq b}^{B} \sum_{i=1}^{K} \bar{H}_{li}^{b} \bar{v}_{li} \bar{v}_{li}^{T} \bar{H}_{li}^{bT},$$

$v_{bk}$ as the improper precoding vector is $\bar{v}_{bk} = \beta_k (\bar{R}_{ici}^{l'} + \sigma^2 I_{2M})^{-1} \bar{H}_{bk}^{bT} \bar{g}_{bk}$, the $\bar{R}_{ici}^{l'}$ is $$\bar{R}_{ici}^{l'} \triangleq \sum_{l \neq b}^{B} \sum_{i=1}^{K} \bar{H}_{bk}^{lT} \bar{g}_{li} \bar{g}_{li}^{T} \bar{H}_{bk}^{l},$$

the $\bar{H}_{yz}^{x}$ represent a transmission channel function when a z-th user in a y-th cell separated into a real number space and an imaginary number space transmits data to an x-th base station, the $\bar{v}_{xy}$ is an improper precoding vector of a y-th user in an x-th cell separated into the real number space and the imaginary number space, the $\alpha_k = 1/\|\bar{g}_{bk}^2\|$ and the $\beta_k = 1/\|\bar{v}_{bk}^2\|$ are conversion constants for making the size of the vector to 1, and the $\sigma^2$ represents a distribution of noise.

6. The base station of claim 4, wherein:

the improper decoding vector is $$\bar{g}_{bk} = \left( \sum_{i=1}^{K} \bar{H}_{bi}^{b} \bar{v}_{bi} \bar{v}_{bi}^{T} \bar{H}_{bi}^{bT} + \bar{R}_{ici}^{b} + \sigma^2 I_{2N} \right)^{-1} \bar{H}_{bk}^{b} \bar{v}_{bk},$$

the $\bar{R}_{ici}^{b}$ is $$\bar{R}_{ici}^{b} \triangleq \sum_{l \neq b}^{B} \sum_{i=1}^{K} \bar{H}_{li}^{b} \bar{v}_{li} \bar{v}_{li}^{T} \bar{H}_{li}^{bT},$$

the $\bar{v}_{bk}$ as the improper precoding vector is $\bar{v}_{bk} = (\bar{R}_{ici}^{l'} + \lambda_{bk} I_{2M})^{-1} \bar{H}_{bk}^{bT} \bar{g}_{bk}$, the $\bar{R}_{ici}^{l'}$ is $$\bar{R}_{ici}^{l'} \triangleq \sum_{l \neq b}^{B} \sum_{i=1}^{K} \bar{H}_{bk}^{lT} \bar{g}_{li} \bar{g}_{li}^{T} \bar{H}_{bk}^{l},$$

the $\bar{H}_{yz}^{x}$ represent a transmission channel function when a z-th user in a y-th cell separated into a real number space and an imaginary number space transmits data to an x-th base station, the $\bar{v}_{xy}$ is s an improper precoding vector of a y-th user in an x-th cell separated into the real number space and the imaginary number space, and the $\lambda_{bk}$ is a value for making the size of the improper precoding vector to 1.

* * * * *